April 4, 1944.  W. E. McCORMICK  2,346,037
RESETTABLE METER FOR INDICATING USE OF RESPIRATOR FILTER CANISTERS
Filed Oct. 29, 1942
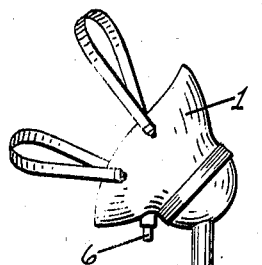
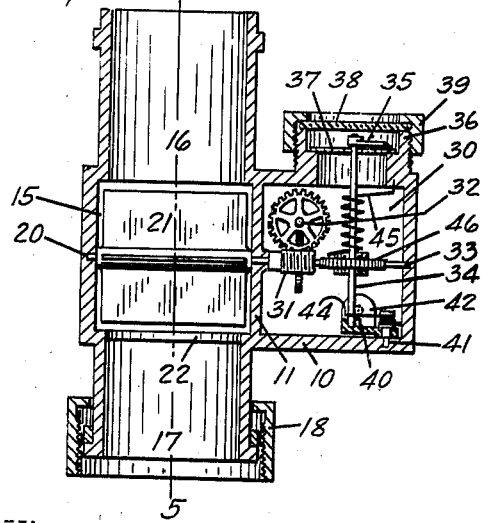
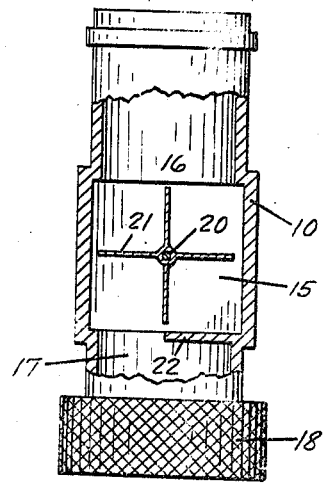
William E. McCormick
Inventor Patented Apr. 4, 1944

2,346,037

UNITED STATES PATENT OFFICE 2,346,037

RESETTABLE METER FOR INDICATING USE OF RESPIRATOR FILTER CANISTERS

William E. McCormick, Mount Penn, Pa., assignor to Willson Products, Inc., Reading, Pa., a corporation of Pennsylvania Application October 29, 1942, Serial No. 463,770

2 Claims. (Cl. 73—229)

My invention relates to protective respirator devices employing replaceable canisters of filtering material used for removing or rendering harmless fumes and poisonous gases and purifying the air breathed in by a user; and more particularly it relates to air-flow metering mechanism for measuring and visibly indicating use of the filtering material by the amount of air drawn through it.

Such filtering material, as well known, after a certain amount of use, cannot be relied upon to safely purify the air drawn through it, and its failure to act cannot always be detected by the user, so it is essential that the metering mechanism shall faithfully indicate the amount of use of each particular canister employed.

The objects of my present invention are to provide a simple and accurate metering mechanism for this need which will show the amount of use of a canister by careful measuring of the flow of purified air drawn through its filtering material, and which will clearly and visibly indicate such use on a dial by an indicator that may be manually reset for each new canister, so that all readings will be made over the same dial traversed space of the scale for quick easy recognition and reading.

The nature of my improvements and the manner of their operation will be more fully described hereinafter in connection with the accompanying drawing, and their novel features pointed out in the appended claims.

Fig. 1 illustrates, in side elevation, a known type of protective respirator, and shows a metering mechanism embodying my invention applied thereto.

Fig. 2 shows separately, and on an enlarged scale, a plan view of the metering mechanism indicated in Fig. 1.

Fig. 3 shows a vertical section of the same, taken on the line 3—3 of Fig. 2.

Fig. 4 is a horizontal section of Fig. 3.

Fig. 5 is a cross sectional view, taken on the line 5—5 of Fig. 3.

Fig. 6 is a detail sectional view of the resetting push button.

My metering mechanism is particularly applicable to certain types of protective respirator devices, and the one shown in Fig. 1 is merely illustrative of this type, and embodies a face piece or mark 1, covering the mouth and nose of a user, and having a breathing tube 2 connecting it with a filtering canister 3, which may be of any known and usual construction; my metering mechanism 4 being shown as connecting the canister 3 to the tube 2. The filtering material in canister 3 will of course be suited for the needs of specific uses, and it ordinarily has a cap 5 over its air inlet opening, generally kept closely sealed when not in use. When in use, as heretofore and well understood, inhalations draw air into the canister through the opening uncovered by removal of cap 5, which inhalations are purified as heretofore by passing through the filtering material in said canister and flow through tube 2 to face piece 1; and exhalations may escape through flap valve 6 on face piece 1 as indicated.

My improved metering mechanism as more clearly seen in the enlarged scale showings of Figs. 2 to 5, consists of a housing 10, having a partition wall 11 dividing its interior into two separate chambers. One chamber 15 is shown with a wall opening into tubular extension 16 adapted for connection with tube 2, and an opposite wall opening into a tubular extension 17 povided with a screw nut 18 engageable with the threaded end of the outlet tube 19 of canister 3. When thus connected, air flow from canister 3 to face piece 1 will be confined to directly passing through chamber 15, and to measure this flow, a propeller shaft 20 is shown as mounted to extend transversely acros said chamber and is provided with vanes 21 driven by the air flow: rotation in a single direction being effected by a baffle plate 22 directing such flow to one side of shaft 20.

The other chamber 30 in housing 10, encloses and separates the metering gearing from the chamber 15, providing for proper safe guarding of such gearing its lubrication without contaminating the filtered air. This gearing, as shown, is driven from a worm 31 on the extension of shaft 20 projecting into chamber 30. Worm 31, through suitable gearing, drives a shaft 32. Shaft 32, through suitable gearing, drives a shaft 33. And shaft 33, through suitable gearing, drives a dial shaft 34. Dial shaft 34, thus driven from shaft 20 and its worm 31, as above described, is shown as having an end extending through a wall opening in chamber 30 into a scale housing 36, and said end carries an indicating dial finger 35, shown as revolving over a suitably marked scale. This housing 36 is provided with a disc scale 37 readable through a transparent cover plate 38 secured in position by screw cap 39. This chamber and scale housing may be sealed if desired to prevent tampering.

As thus far described, air flow from canister 3 passing through chamber 15 will rotate shaft 20, and through the gearing in chamber 30, rotate dial finger 35 around disc scale 37, which will be suitably marked to indicate use of the filter material in canister 3. The dial will clearly indicate uses of the filtering material, so the value of the canister for further use may be visibly determined.

In order to simplify the scale reading and make it uniform for each new canister, avoiding errors in noting the position of the dial finger at the start of a new canister and calculation as to its position on exhaustion of the canister, I provide manual means for resetting the dial finger to a starting position without opening the casing which might easily disarrange its delicate gearing mechanism.

The manual means for this purpose, as shown in the drawings, consists of a bearing plate 40 for the end of dial shaft 34, which plate is pivoted to a wall of housing at 41 and has an angled projection 42 engageable by a push button 43 extending through a wall of said housing and is operative to pivotally swing plate 40 on its pivot connection 41. A spring 44 provides a biased tension for plate 40 against the action of push button 43, and a coil spring 45 on shaft 34 is tensioned to normally rotate said shaft reversely to its gear driven rotation. The action of manual push on button 43 pivotally swings plate 40 on its pivot 41, against the tension of spring 44, sufficiently to move the end of shaft 34 enough to disengage its gear wheel 46 from its normally meshing gear on shaft 33, and when thus disconnected, shaft 34 is reversely turned by its spring 45 until its dial finger 35 is moved back to its starting position, which may be determined by a suitable stop pin 47 to limit the reverse turning of shaft 34. The push button 43 will of course only be manually operated when a new canister is connected, and the reading for each such added canister will always start at the same part on disc scale 37 and move over the same to a marking indicating exhaustion of safe filtering action, making such readings uniform for each canister and quickly familiar to a user, with no danger of error due to improper notation of a starting position and miscalculation as to an exhaustion position. And to insure against accidental operation of push button 43, its head is shown as buried within the wall of the housing so it can only be operated by some pointed tool as a pencil point or the like, and this wall opening may desirably be sealed by a flexible cover, as a rubber disc indicated.

My metering mechanism as above described will accomplish my stated objects, and the preferred detailed construction set forth may of course be modified within the scope of my invention as defined in the following claims.

What I claim is:

1. In a meter mechanism for registering the air flow from an air-filtering canister to a respirator comprising a housing having an air-passageway therethrough for filtered air and a separate gear chamber, a measuring propeller in said passageway adapted to be driven by the passing air and having a shaft extending into said gear chamber, a visible scale in one wall of said gear chamber having an indicator finger cooperating with said scale and an operating shaft for said finger, and gears connecting said operating shaft with said propeller shaft extension, means for resetting said indicator finger to a starting position on said scale, comprising a bearing seat for one end of said finger-operating shaft movable to disengage said gears, a spring for said operating shaft tensioned to reversely turn the same, and a button in a chamber wall aperture manually operative to move said shaft bearing seat so as to disengage said gears and free said operating shaft for reverse turning by said tensioned spring.

2. In the construction set forth in claim 1, said button lying within said chamber wall aperture and having a flexible protective outer cover inwardly bendable to operate said button.

WILLIAM E. McCORMICK.